(No Model.)
J. H. HAYDEN & J. R. SLEEPER.
MACHINE FOR CONVERTING WOOD INTO FIBER.
No. 298,851. Patented May 20, 1884.
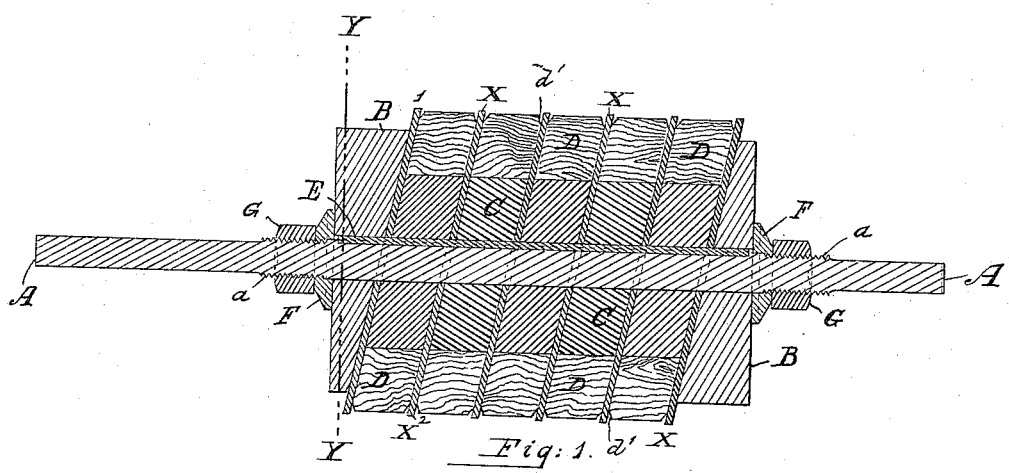
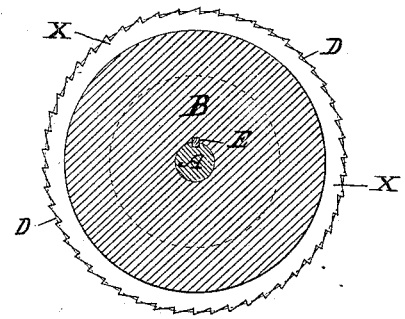
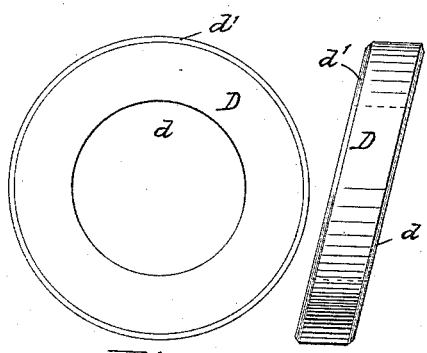
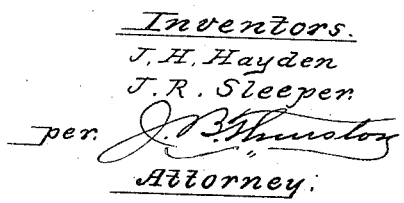
Witnesses.
C. Hutchins
F. A. Merrill
Inventors.
J. H. Hayden
J. R. Sleeper
per J. P. Thurston
Attorney.

UNITED STATES PATENT OFFICE.

JOSEPH H. HAYDEN AND JONATHAN R. SLEEPER, OF BRISTOL, N. H., ASSIGNORS OF ONE-THIRD TO CYREL R. ALDRICH, OF BOSTON, MASS.

MACHINE FOR CONVERTING WOOD INTO FIBER.

SPECIFICATION forming part of Letters Patent No. 298,851, dated May 20, 1884.

Application filed March 20, 1884. (No model.)

*To all whom it may concern:*

Be it known that we, JOSEPH H. HAYDEN and JONATHAN R. SLEEPER, citizens of the United States, and residents of Bristol, in the county of Grafton and State of New Hampshire, have invented a certain new and Improved Device for Converting Wood into Fiber, of which the following is a clear and exact description.

The invention consists of a series of circular saws, which we place upon an arbor and separate equidistant from each other by suitable collars made of wood or metal, or both, and so formed as to cause the saws to set at an angle upon said arbor, and be so retained and held in position by outside collars and nuts, which are threaded to said arbor and all carried in suitable bearings outside of said saws, and driven by an ordinary belt and pulley.

The invention will be clearly understood by reference to the accompanying drawings, forming part of this specification, in which similar letters of reference indicate corresponding parts in all the figures, of which—

Figure 1 represents a longitudinal sectional elevation of an arbor upon which are placed several saws with their separators, and clamped together by suitable nuts. Fig. 2 is a cross-section of the same, taken at line Y Y. Figs. 3 and 4 are respectively a side and face view of that portion of one of the separators which is preferably formed of wood; and Figs. 5 and 6 are respectively a side and face view of that portion of one of the separators which is mounted upon the saw-arbor, and which is preferably made of iron.

The saw-arbor A is of larger diameter for the distance occupied by the saws than at its journals, as is shown in Fig. 1.

The separator-collars C are best formed of cast-iron, and after being faced off may be bored, the whole being made on an angle, the exact pitch of which will be hereinafter explained, and provided with a slot, c, extending from side to side of said separator-collar, and upon its periphery are formed two or more small tongues or ridges, c', running transversely, as shown in Figs. 5 and 6.

The collar D is formed of some suitable wood, and the hole d made a snug fit for the outside of the piece C, upon which it may be driven, the ridges c' forcing their way into the said collar D, and serving to prevent the same from turning upon said piece C.

The collars B are made perfectly flat upon their outside, and their inside inclined in conformity to the collar C D, and after placing a saw, X, between each of the collars C D and placing the collars B against either of the outside or end saws X, and the small collars F against said collars B, the whole may be clamped upon the saw-arbor A by means of the nuts G, which are threaded to said saw-arbor at $a$, as shown in Fig. 1. Said arbor may then be placed in suitable bearings, their position being close to the threaded part $a$ of said arbor, one end of which will project through and beyond its bearing far enough to carry a belt-pulley by which motion may be transmitted to the saws from a driving-shaft.

To prevent the saws X and collars B C from turning upon the saw-arbor A, the key E is provided, which enters and may be driven into a groove in said saw-arbor, and the collars B C and the saws X be grooved in like manner to receive the projecting portion of said key E, as shown at $c$, Fig. 5, and also in Fig. 2. The number of saws used need not be limited to six, as in Fig. 1, for any number from three to a dozen can be used and accomplish good results. The more saws placed upon one arbor the more fiber will be produced. The angle to be given to the saws, however, is determined by their diameter and the width of the separating-collars—*i. e.*, the greater the width of the separator-collars for a given diameter the greater must be the incline of the saws. This is illustrated by the saws marked 1 and 2, (shown in Fig. 1,) the top of the first saw being just opposite to the bottom of the second saw.

We form the separators in two parts, C D, simply to lighten them, which is accomplished by forming the one D of wood. There is also one other advantage in having wood separators—viz., whenever the saws are sharpened they will necessarily be slightly reduced in diameter, which will necessitate turning down the separators, which, if formed of wood, will be a much less costly operation than if made of iron. The diameter of the separator-collars D must be but a trifle less than that of the saws, in order that the fiber obtained from the wood being operated upon may be of the finest quality. The edges of the collars D are chamfered, as shown at d', Figs. 3 and 4, thus insuring perfect work without liability of clogging.

By actual experiment we find that saws mounted upon an arbor in the manner described, and revolved at a speed of three thousand revolutions per minute, or thereabout, will rapidly convert wood fed against said saws into a fine thready fiber, which, when boiled down in the usual manner, produces a better quality of pulp than can be produced by any other process or machine of which we are aware.

The stock used may be fed against the saws with the grain running parallel with the saw-arbor or otherwise; but the former method will produce the best result.

It may be here stated that the fiber produced is entirely free from "sawdust," which renders it the more valuable for making pulp.

Having thus fully described our invention, what we claim, and desire to secure by Letters Patent of the United States, is—

1. The herein-described means for converting wood into fiber, consisting of a series of three or more circular saws, separated by wooden collars, provided in their center with holes bored on an angle with the parallel sides thereof, and all mounted upon an arbor and securely clamped thereon by suitable end collars and nuts threaded to said arbor, hung in suitable bearings, and driven by means of a pulley and belt, substantially in the manner and operating as and for the purpose set forth.

2. The herein-described means for converting wood into fiber, consisting of a series of three or more circular saws, separated by collars composed of wood and metal, provided in their center with holes bored on an angle with the parallel sides thereof, and all mounted upon an arbor and securely clamped thereon by suitable end collars and nuts threaded to said arbor, hung in suitable bearings, and driven by means of a pulley and belt, substantially in the manner and operating as and for the purpose set forth.

3. The combination, with the saw-arbor A, of a series of saws, X, mounted thereon and held on an angle by the metal and wooden separator-collars C D, (the collar D having chamfered corners d',) the end collars, B F, the spline E, fitting key-seats in said arbor A, collars B C, and saws X, and suitable nuts, G, all constructed and operating substantially as and for the purpose set forth.

JOSEPH H. HAYDEN.
JONATHAN R. SLEEPER.

Witnesses:
IRA A. CHASE,
LEWIS W. FLING.